United States Patent
Chan et al.

(10) Patent No.: US 9,954,822 B2
(45) Date of Patent: *Apr. 24, 2018

(54) DISTRIBUTED TRAFFIC MANAGEMENT SYSTEM AND TECHNIQUES

(71) Applicant: Netflix, Inc., Los Gatos, CA (US)

(72) Inventors: Jason Chan, Campbell, CA (US); Poornaprajna Udupi, San Jose, CA (US); Shashi Madappa, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,254

(22) Filed: Mar. 28, 2017

(65) Prior Publication Data

US 2017/0201489 A1     Jul. 13, 2017

Related U.S. Application Data

(63) Continuation of application No. 14/495,631, filed on Sep. 24, 2014, now Pat. No. 9,621,588.

(51) Int. Cl.
*H04L 29/06* (2006.01)
*H04L 29/08* (2006.01)

(52) U.S. Cl.
CPC ...... *H04L 63/0245* (2013.01); *H04L 63/0218* (2013.01); *H04L 63/20* (2013.01); *H04L 67/10* (2013.01)

(58) Field of Classification Search
CPC ............. H04L 63/0218; H04L 63/0227; H04L 63/0236; H04L 63/0254; H04L 63/0263; H04L 63/029; H04L 63/101; H04L 63/105; H04L 63/1408; H04L 63/1425; H04L 63/1458; H04L 63/20; G06F 17/30312
See application file for complete search history.

(56) References Cited

U.S. PATENT DOCUMENTS

| 6,530,024 | B1 | 3/2003 | Proctor |
| 7,152,240 | B1 | 12/2006 | Green |
| 7,225,269 | B2 | 5/2007 | Watanabe |

(Continued)

OTHER PUBLICATIONS

European Patent Office, "Search Report" in application No. PCT/US2015/051783, dated Dec. 9, 2016, 11 pages.

(Continued)

*Primary Examiner* — Minh Dinh
(74) *Attorney, Agent, or Firm* — Artegis Law Group, LLP

(57) ABSTRACT

Approaches, techniques, and mechanisms are disclosed for implementing a distributed firewall. In an embodiment, many different computer assets police incoming messages based on local policy data. This local policy data is synchronized with global policy data. The global policy data is generated by one or more separate analyzers. Each analyzer has access to message logs, or information derived therefrom, for groups of computer assets, and is thus able to generate policies based on intelligence from an entire group as opposed to an isolated asset. Among other effects, some of the approaches, techniques, and mechanisms may be effective even in computing environments with limited supervision over the attack surface, and/or computing environments in which assets may need to make independent decisions with respect to how incoming messages should be handled, on account of latency and/or unreliability in connections to other system components.

20 Claims, 5 Drawing Sheets

(56) References Cited

U.S. PATENT DOCUMENTS

| | | |
|---|---|---|
| 7,559,082 B2 | 7/2009 | Morgan et al. |
| 2003/0188191 A1 | 10/2003 | Aaron et al. |
| 2004/0015719 A1 | 1/2004 | Lee |
| 2005/0010765 A1 | 1/2005 | Swander |
| 2005/0038881 A1 | 2/2005 | Ben-Itzhak |
| 2006/0248580 A1 | 11/2006 | Fulp et al. |
| 2008/0059474 A1 | 3/2008 | Lim |
| 2009/0328187 A1 | 12/2009 | Meisel |
| 2014/0173712 A1 | 6/2014 | Ferinand |
| 2016/0088020 A1 | 3/2016 | Chan et al. |

OTHER PUBLICATIONS

Claims in European Application No. PCT/US2015/051783, dated Dec. 2015, 5 pages.

Anonymous, "Riverbed Stingray Application Firewall," pub. by Riverbed Technology, San Francisco, 2011, 4 pages.

Anonymous, "Art of Defence Hyperguard Web Application Firewall-Attack Detection and Protection," pub. by Art of Defence GmbH, Germany and distributed in United States in 2009, 4 pages.

DISTRIBUTED TRAFFIC MANAGEMENT SYSTEM AND TECHNIQUES

BENEFIT CLAIM

This application claims the benefit as a Continuation of U.S. application Ser. No. 14/495,631, filed Sep. 24, 2014, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates to managing network traffic at distributed network assets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The attack surface of a networked computer system consists of the components within that computer system that are exposed to access by a potential attacker. Such components may include, for instance, applications executed by a web server and other server-based applications. It is typically desirable for user-operated clients to interact with these components over one or more computer networks. Thus the components feature various interfaces for interacting with clients over those one or more networks. For example, the components may expose web-based graphical user interfaces ("GUIs") comprising user input controls, interfaces for receiving user input via predefined protocols such as Hyper-Text Transfer Protocol ("HTTP") or Simple Object Access Protocol ("SOAP"), customized application programming interfaces ("APIs"), and/or other services by which the components receive and react to communications from user-operated client devices.

While user access to the components is typically desirable, providing the user access sometimes leaves the components vulnerable to unauthorized uses, in which an unauthorized user succeeds in causing the components to execute in manners that are unintended or undesired by the owner of the computer system. Examples of unauthorized uses, which are also known as "attacks," include without limitation: passive attacks, such as wiretapping, and active attacks such as denial of service, scripted account creation, server or account hijacking, buffer overflow, heap overflow, and format string attacks.

For the purposes described herein, an attack need not necessarily be malicious in intent, but may rather be any undesirable behavior, including, for example, a user unintentionally over-using system resources. For instance, a computer system may provide access to a wide variety of media resources, and a user may unintentionally create or deploy software code, such as code for a media server, that when executed causes a computing device to repeatedly and systematically request access to the media resources, so as to compile and/or analyze a library of information about the media resources. This behavior may, however, be undesirable for the computer system, since it may negatively impact the system's ability to respond to more traditional ad hoc requests for media items. Various traffic management schemes may be devised to address this and other undesirable behavior.

A firewall is an example traffic management component of a networked computer system. Examples of firewall components include dedicated appliances, software-based applications running on computer devices within a system, or any other system components that act as gateways for network traffic. Many conventional networked computer systems are configured such that a firewall intercepts all, or at least the majority, of messages sent between potentially untrusted client devices outside of the computer system and trusted components within the computer system. The messages may be intercepted at one or at multiple levels. For instance, some firewalls intercept messages at a network layer or transport layer, such as messages in the form TCP or UDP packets, and/or at an application layer, such as messages in the form of FTP, DNS, or HTTP requests. Other firewalls intercept any of a wide-variety of message types, at any of a wide variety of layers.

Conventionally, a firewall is configured to compare one or more policies to the intercepted messages, so as to determine one or more actions to take with respect to the intercepted messages. A variety of different actions may be taken, such as allowing the message to reach its addressed destination, redirecting a message, blocking a message, manipulating a message, logging certain details about the message, and so forth. Policies are sometimes referred to as filters, in that they often "filter out" unwanted messages by blocking them altogether. A simple example of a policy is a rule that a message having characteristics that match certain criteria specified by the rule, such as a specified source address or destination port, should be blocked. A firewall may be configured to apply a variety of policies that are intended to block or minimize attacks on system assets. In some systems, a firewall may even be adaptive, in that it is configured to learn from previously-received traffic and adjust its policies to better react to future attacks.

In networked computer systems where the attack surface is highly distributed, it is often difficult to effectively deploy an adaptive firewall. A single attack may originate almost concurrently from a wide variety of sources, and affect many different assets on the attack surface. It is thus useful to centrally analyze the traffic passing through the networked computer system so as to recognize certain attacks and understand their scope. Yet, relying on a single, centralized firewall component to intercept and analyze each message is sometimes undesirable or infeasible.

SUMMARY OF THE INVENTION

The appended claims may serve to summarize the invention.

DETAILED DESCRIPTION

Figure 1:
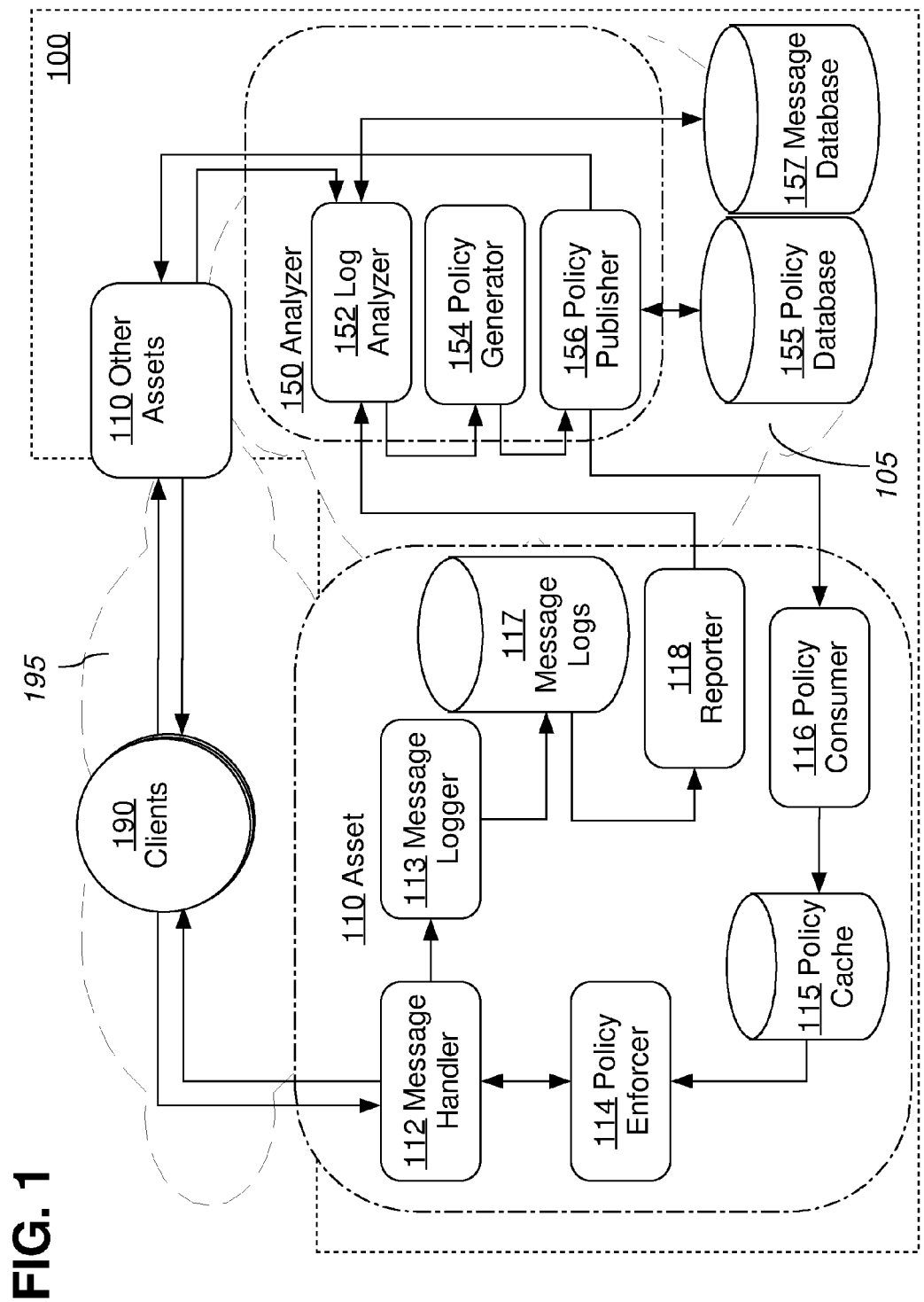
FIG. 1 illustrates an example networked computer system in which the described techniques may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0. General Overview
 2.0. Structural Overview
  2.1. Assets
  2.2. Clients
  2.3. Message Handling
  2.4. Policy Enforcement
  2.5. Log Reporting and Analysis
  2.6. Policy Generation and Publication
  2.7. Distributed Analyzers
  2.8. Mid-Tier Components
  2.9. Miscellaneous
 3.0. Functional Overview
  3.1. Applying Local Policies
  3.2. Policy Generation and Publication
 4.0. Example Implementation Details
  4.1. Example Policy Structures
  4.2. Example Policy Caches
  4.3. Example Configuration Options
  4.4. Example Message Logs
  4.5. Example Queries
 5.0. Hardware Overview

1.0. General Overview

Approaches, techniques, and mechanisms are disclosed for distributed traffic management in a networked computer system. In an embodiment, many different computer assets police incoming messages based on local policy data. This local policy data is synchronized with global policy data. The global policy data is generated by one or more separate analyzers. Each analyzer has access to message logs, or information derived therefrom, for groups of computer assets, and is thus able to generate policies based on intelligence from an entire group as opposed to an isolated asset. Among other effects, some of the approaches, techniques, and mechanisms may be effective even in computing environments with limited supervision over the attack surface, and/or computing environments in which assets may need to make independent decisions with respect to how incoming messages should be handled, on account of latency and/or unreliability in connections to other system components.

According to an embodiment, a computer system that implements distributed traffic management comprises a data repository storing global policy data that describes policies. The system further comprises a plurality of computer assets, implemented at least partially by first computer hardware. Each asset of the plurality of computer assets is configured to: receive messages from client devices, store local policy data describing the policies at a computing device that implements the asset, determine which of the policies apply to which of the messages, identify policy-based actions to perform with respect to the messages based on which of the policies apply to which of the messages, send message information logged from the messages to an analyzer component, and update the local policy data to reflect updates to the global policy data. The system further comprises an analyzer component, implemented at least partially by second computer hardware. The analyzer component is configured to: receive the message information from each of the plurality of computer assets, collectively analyze the message information from each of the plurality of computer assets, generate new policies based on collectively analyzing the message information, and update the global policy data to describe the new policies.

In an embodiment, each asset of the plurality of computer assets is deployed at an edge of a first network, and wherein the client devices are deployed within a second network. In an embodiment, an asset of the plurality of computer assets is deployed in front of a server application, which is not in the plurality of computer assets, and to which the messages received by the asset are directed. In an embodiment, an asset of the plurality of computer assets is further configured to execute a web server application configured to respond to the messages received by the asset. In an embodiment, the plurality of computer assets and the analyzer are deployed in a first region of the computer system, the computer system further comprising one or more additional regions, each region comprising a separate plurality of computer assets and a separate analyzer, the data repository being shared between the first region and the one or more additional regions. In an embodiment, the first computer hardware includes one or more computing devices that are not included in the second computing hardware.

In an embodiment, the analyzer is further configured to: identify one or more of the new policies based on determining, from the collective message information, that a condition described by a system-level policy exists, generate one or more asset-level policies comprising logic for identifying messages to block or redirect in view of the described condition, and update the global policy data to include the generated one or more asset-level policies.

In an embodiment, the analyzer is further configured to: identify a distributed attack on the computer system based on the collective message information, generate a first policy comprising logic for identifying messages involved in the distributed attack, and update the global policy data to describe the first policy. In an embodiment, the analyzer is further configured to, based on the collective message information: identify an attack that is occurring at a first asset of the plurality of computer assets, generate a first policy comprising logic for identifying messages involved in the attack, and update the global policy data to describe the first policy. A second asset of the plurality of computer assets is configured to: based on the updated global policy data, update the local policy data of the second asset to describe the first policy, the second asset having not yet received messages involved in the attack at the time the local policy data of the second asset is updated, and, based on the first policy, block or redirect a message involved in the attack.

In an embodiment, each policy of the policies is a data structure that indicates logic for determining whether the policy applies to a given message, as well as one or more instructions indicating one or more particular policy-based actions to perform with respect to the given message if the policy applies to the given message. In an embodiment, the messages indicate designated actions for the plurality of assets to perform, wherein each asset is configured to perform the applicable policy-based actions instead of or in addition to the indicated designated actions for messages to which the policies apply. In an embodiment, a policy-based action indicated by a given policy of the policies is one of: blocking any message to which the given policy applies, redirecting any message to which the given policy applies, or allowing an asset to respond normally to any message to which the given policy applies.

In an embodiment, updating the local policy data comprises one of: receiving policy data describing the global policy data from the analyzer component, or retrieving the global policy data from a shared data repository.

According to an embodiment, a data processing method comprises: storing, at a computer asset, local policy data describing policies. The method further comprises receiving, at the computer asset, messages from client devices. The method further comprises determining, at the computer asset, which of the policies apply to which of the messages. The method further comprises identifying, at the computer asset, policy-based actions to perform with respect to the messages based on which of the policies apply to which of the messages. The method further comprises sending, from the computer asset, message information logged from the messages to an analyzer component. The message further comprises updating, by the computer asset, the local policy data to reflect updates to global policy data generated by the analyzer component. The computer asset is implemented by one or more computing devices.

In an embodiment, the method further comprises applying policies from the local policy data to messages even when the analyzer component and the global policy data are inaccessible to the asset. In an embodiment, the computer asset is deployed in front of server application to which the messages received by the computer asset are directed. In an embodiment, the method further comprises executing, at the computer asset, a web server application that responds to at least some of the messages received by the computer asset. In an embodiment, updating the local policy data comprises one of: receiving policy data describing the global policy data from the analyzer component, or retrieving the global policy data from a shared data repository.

In an embodiment, each policy of the policies is a data structure that indicates logic for determining whether the policy applies to a given message, as well as one or more instructions indicating one or more particular policy-based actions to perform with respect to the given message if the policy applies. In an embodiment, a policy-based action indicated by a given policy of the policies is one of: blocking any message to which the given policy applies, redirecting any message to which the given policy applies, or allowing an asset to respond normally to any message to which the given policy applies. In an embodiment, the messages indicate designated actions for the plurality of assets to perform, and the method further comprises performing applicable policy-based actions instead of or in addition to the designated actions indicated for messages to which the policies apply.

In an embodiment, the method further comprises receiving, at the analyzer component, message information logged at each asset of a plurality of computer assets, including the computer asset. The method further comprises collectively analyzing, by the analyzer component, the message information logged at each of the plurality of computer assets. The method further comprises generating, by the analyzer component, new policies based on collectively analyzing the message information. The method further comprises updating, by the analyzer component, the global policy data to describe the new policies.

In an embodiment, the method further comprises executing multiple sets of computer assets that perform the steps of the above recited computer asset. The assets in a given set of the multiple sets send their respective message information to a same analyzer component, of a plurality of analyzers, which is assigned to the given set. The method further comprises storing the global policy data in a data repository shared amongst at least the plurality of analyzers. Each of the plurality of analyzers separately generates new policies, and updates the same global policy data to describe the respectively generated new policies.

In an embodiment, the method further comprises identifying, at the analyzer component, one or more of the new policies based on determining, from the collective message information, that a condition described by a system-level policy exists. The method further comprises generating one or more asset-level policies comprising logic for identifying messages to block or redirect in view of the described condition. The method further comprises updating the global policy data to include the generated one or more asset-level policies.

In an embodiment, the method further comprises identifying, by the analyzer component, a distributed attack on the plurality of computer assets based on the collective message information. The method further comprises generating a first policy comprising logic for identifying messages involved in the distributed attack. The method further comprises updating the global policy data to describe the first policy.

In an embodiment, the method further comprises, based on the collective message information, the analyzer component identifying an attack that is occurring at the computer asset. The method further comprises generating, by the analyzer component, a first policy comprising logic for identifying messages involved in the attack. The method further comprises updating, by the analyzer component, the global policy data to describe the first policy. The method further comprises, based on the updated global policy data, at another computer asset of the plurality of computer assets, updating local policy data of the other asset to describe the first policy, the other asset having not yet received messages involved in the attack at the time the other asset updates the local policy data of the other asset. The method further comprises, based on the first policy, the other asset blocking or redirecting a message involved in the attack.

According to an embodiment, a data processing method comprises receiving message information from each asset of a plurality of computer assets, the message information describing messages received by the asset. The method further comprises collectively analyzing the message information from each of the plurality of computer assets. The method further comprises generating policies based on collectively analyzing the message information, the policies describing logic for identifying messages to which the policies apply, as well as policy-based actions to perform with respect to the messages to which the policies apply. The method further comprises updating a global policy data repository to describe the policies. The method further comprises sending policy data to the plurality of computer assets, the policy data at least describing the policies in the global policy data repository. The method is performed by one or more computer devices that implement an analyzer component.

In an embodiment, the analyzer component is one of a plurality of analyzers, each configured to perform the steps recited in the previous paragraph with respect to a different plurality of computer assets. The global policy data repository is shared amongst at least the plurality of analyzers.

In an embodiment, the method further comprises identifying one or more of the policies based on determining, from the message information, that a condition described by a system-level policy exists. The method further comprises generating one or more asset-level policies comprising logic for identifying messages to block or redirect in view of the described condition. The method further comprises updating the global policy data to include the generated one or more asset-level policies.

In an embodiment, the method further comprises identifying a distributed attack on the computer system based on collectively analyzing the message information. The method further comprises generating a first policy comprising logic for identifying messages involved in the distributed attack. The method further comprises updating the global policy data to describe the first policy.

In an embodiment, the method further comprises based on the message information, the analyzer component identifying an attack that is occurring at a first computer asset. The method further comprises generating a first policy comprising logic for identifying messages involved in the attack at at least a second asset of the plurality of computer assets, the analyzer component having not yet received message information from the second asset indicating that the second asset has received messages involved in the attack. The method further comprises updating the global policy data to describe the first policy.

In an embodiment, a policy-based action indicated by a given policy of the policies is one of: blocking any message to which the given policy applies, redirecting any message to which the given policy applies, or allowing an asset to respond normally to any message to which the given policy applies. In an embodiment, sending the policy data comprises one of: responding to direct queries from the plurality of computer assets to the global data repository, or retrieving, by the analyzer component, the policy data from the global data repository and sending the policy data from the analyzer component to the plurality of computer assets. In an embodiment, a first asset of the plurality of computer assets is deployed in front of server application to which messages received by the first asset are directed. In an embodiment, a first asset of the plurality of computer assets executes a web server application that responds to at least some messages received by the first asset.

In other aspects, the invention encompasses a computer apparatus and a computer-readable medium configured to carry out the foregoing steps.

2.0. Structural Overview

FIG. 1 illustrates an example networked computer system 100 in which the described techniques may be practiced, according to an embodiment. System 100 comprises one or more computing devices. These one or more computing devices comprise any combination of hardware and software configured to implement the various logical components described herein, including components 105-157. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In an embodiment, system 100 is a server computer system, comprising one or more server computer devices that collectively implement the various components of system 100 as a set of server-side processes. The server computer system may include web server, application server, database server, and/or other conventional server components that the depicted components utilize to provide the described functionality. In an embodiment, certain server components may be implemented in full or in part using "cloud"-based systems that are coupled to system 100 by one or more networks, such as the Internet. The cloud-based systems may expose interfaces by which they provide processing, storage, software, and/or other resources to the components of system 100. In an embodiment, the cloud-based systems may be implemented by a third-party entity, on behalf of another entity for whom system 100 is deployed. In other embodiments, however, the components of system 100 may be implemented entirely by computer systems owned and operated by a single entity.

2.1. Assets

As used herein, an asset is generally a logical or physical component of a networked computer system. The asset may be a computing device, a system of computing devices, or a component implemented by any combination of hardware and/or software at such computing devices or systems of computing devices. In an embodiment, an asset comprises one or more server-side interfaces by which server-based applications interact with client computers over one or more computer networks. For example, assets may include web servers, application servers, specific websites, specific applications, mail servers, and so forth.

System 100 comprises, amongst other components, a set of assets 110 connected by a network 105, or a group of networks 105. Network 105 may be, for instance, a trusted network, such as an internal network or intranet. System 100 may, depending on the embodiment, include a wide variety of types of components that are not depicted, such as other assets, routers, personal computers, development devices, backup servers, and so forth. Neither network 105 nor the components directly connected thereto need necessarily be constrained to a single physical area. For instance, network 105 may, in some embodiments, comprise multiple sub-networks deployed in different geographic regions, but which are connected via dedicated lines, virtual private networks, and/or any other suitable mechanism(s).

Assets 110 function, at least in part, as traffic management components responsible for managing at least some aspect of network traffic on network 105. Assets 110 are exposed to communications with clients 190 over at least one network 195. In contrast to network 105, network 195 may be an untrusted and/or unsupervised network external to system 100, such as a public wide area network or the Internet, over which the owner or operator of system 100 does not exercise control. Hence, communications may be received over network 195 from client computing device that are not pre-approved by the owner or operator of system 100. In at least one such embodiment, each asset 110 forms part of the attack surface of system 100, in that each asset 110 receives messages directly from one or more clients 190 over network 105, without the message having first passed through a firewall or other traffic management component in system 100. However, in other embodiments, a message may pass through any number of other components before arriving at an asset 110, such as routers, load balancers, other assets 110, or even dedicated firewalls. Moreover, in at least some embodiments, there may not be a distinction between network 195 and network 105 at all.

In some embodiments, some or all of assets 110 may be dedicated firewall appliances, dedicated software firewalls, proxy servers, edge service applications, load balancers, gateway devices, and/or other traffic management components, that are deployed in front of one or more other assets, and through which messages directed to the other assets are routed for security or other purposes prior to delivery to the other assets. In other embodiments, it may be advantageous to forego the use of separate traffic management components, such that some or all of assets 110 are themselves the intended destination of a message. For instance, an asset 110 may be a web application, API server, or streaming server that features its own integrated traffic management component.

In some embodiments, one or more libraries of computing code may be made available for implementing the described techniques. The one or more libraries comprise instructions which, when executed by an asset 110, cause implementation of some or all of the depicted traffic management components of asset 110. Each asset 110 may include or reference the same one or more libraries so as to implement the traffic management components. For instance, the one or more libraries may be incorporated into an open source web application framework, such as the Zuul framework for edge services produced by Netflix, Inc., and each asset 110 may be an instance thereof. Optionally, each asset 110 may then separately include code that implements other undepicted additional components to perform other functions with respect to messages. For instance, some assets 110 may execute code that implements additional web application components, while other assets 110 may execute code that implements additional API server components. In other embodiments, assets 110 may implement some or all of depicted traffic management components on an ad hoc basis, rather than relying on a common set of libraries.

2.2. Clients

Clients 190 may be individual computing devices or components thereof, often operated by an end-user. For instance, a client 190 may be a web browser on a desktop computer, a set-top media box, an application executing on a mobile device, and so forth. Via network 195, certain components of system 100, potentially including assets 110, provide various networked services to the clients 190, such as delivering web pages, streaming media contents, sending emails, responding to Application Programming Interface ("API") calls, and so forth. To this end, clients 190 may send and/or receive a variety of messages to assets 110.

2.3. Message Handling

Asset 110 comprises at least one message handler component 112. Message handler 112 is configured to receive messages from and/or to the clients 190 over a communication interface. For the purposes described herein, a message may include any data structure that is sent to or from a client 190 or asset 110. A message may be, for instance, a datagram or packet in accordance with any of a wide variety of standard networking protocols, such as, without limitation, a TCP or UDP packet, HTTP request or response, or FTP packet. In an embodiment, a message is constructed so as to include a "payload," comprising the contents of the message, as well as "header" or "transactional" information, such as identifiers for the sender and/or the intended recipient (e.g. IP addresses, MAC addresses, domain names, email addresses, etc.), a port number over which the message is being communicated, a message type or other categorical information, timestamps, routing instructions, and so forth. However, techniques described herein are not limited to any particular form of message. There may furthermore be multiple layers of messages, in that a group of related messages in one layer, such as a network layer or transport layer, are constructed or interpreted to form a single message at another layer, such as an application layer. Depending on the embodiment, the described techniques may be applied to messages of any of a wide variety of message types and/or messages at one or several different layers.

Message handler 112 may be configured to identify and perform one or more designated actions in response to receiving a message. Example designated actions include, without limitation, retrieving and returning requested data structures, generating and storing or returning data structures based on parameters specified by the message, forwarding the message to another asset specified or indicated by the message, selecting an asset to forward the message to, and so forth. A designated action may be specified in the message. For instance, message handler 112 may be a web application server, and the message may be a request to return data from a specified location or execute a specified command. Or, the designated action may be implicit from some aspect of the message, such as header or transactional information. For instance, a destination IP address, port number, and/or URL path may indicate to the asset 110 to forward the message to another asset. In some embodiments, the designated action may be the same for for all messages received by the asset 110. For instance, asset 110 may be a proxy server component that is configured to always forward messages to a specific server or application.

However, prior to performing any designated action for a message (or even identifying the designated action), message handler 112 is configured to send the received message to a policy enforcer 114 for pre-processing, so as to determine whether any policy-based action should be performed prior to or instead of any designated action. As a result of this pre-processing by policy enforcer 114, described elsewhere in this application, message handler 112 may, in some embodiments, receive an indication of whether the message handler 112 should continue to process the message in a normal manner and thus perform the designated action(s), ignore the message, or perform other policy-based actions, such as redirecting the message or replying with a designated status code or error message. In other embodiments, policy enforcer 114 may be responsible for performing policy-based actions, and message handler 112 will thus only receive an indication of whether it should continue processing the message in the normal manner.

Message handler 112 is further configured to send the received messages, or information derived therefrom, to a message logger component 113. The messages and/or information derived from the messages are then logged in message logs 117. Message logs 117 may be stored in any suitable form of data repository. Message logs 117 may describe any suitable properties for a message, such as header field values, payload contents, and so forth. Message logs 117 may be a temporary repository, such as a circular cache, in which only a certain amount of messages is stored. Or, message logs 117 may be stored in a more permanent form.

Depending on the type of action designated by a given message, and/or on whether any policies are applied, a client 190 may or may not receive a reply message in response to the given message. A reply message may be sent from or relayed through message handler 112 or another component of asset 110. Or, if the asset 110 relayed the original message to another component of system 100, the reply message may in some embodiments be received directly from that other component. Message logs 117 may further indicate whether a given message was responded to, how it was responded to, and/or message logs 117 may include operating statistics related to processing the message, such as system resource usage.

2.4. Policy Enforcement

Asset 110 further comprises policy enforcer 114. Policy enforcer 114 is configured to analyze messages and/or information associated with the messages in view of policies recorded in local policy cache 115. Local policy cache 115 stores the policies as data structures, such as files, lines of files, database records, and so forth, on a storage device that is in or directly connected to a computing device on which asset 110 is implemented, so that the policies are readily available to policy enforcer 114.

A policy comprises logic for determining whether a policy "applies to" a message, as well as one or more instructions indicating one or more policy-based actions to perform with respect to the message if the policy applies. The logic may be based on intrinsic details of the message, such as header information or payload contents. The logic may optionally be further based on information about previous messages that may be related to the instant message, such as a count of previous messages of a certain type or that have a certain designated source. This type of information may be logged in, for example, message logs 117.

For some policies, the logic may be a simple specification of a particular field or characteristic of the message to examine, along with one or more values or value ranges that, if matched, indicate that the policy applies to the message. Other policies may specify additional message fields or characteristics for examination. As another example, the logic may specify a function for calculating a statistic based on all messages received over a period of time that have, for a specified message field or characteristic, a same value (or a value within a same range of values) as the instant message. The logic may further indicate a value to compare the calculated statistic to in order to determine if the policy applies. Of course, the techniques described herein are not limited to any particular type of logic for expressing a policy, and may be utilized with respect to a wide variety of policies of varying complexity.

If it is determined that a policy applies to a message, depending on the embodiment, policy enforcer 114 may perform the one or more policy-based actions that should be taken with respect to the message, or instruct another component, such as message handler 112, to perform the one or more policy-based actions.

2.5. Log Reporting and Analysis

System 100 further comprises at least one analyzer 150. Analyzer 150 is external to assets 110. For instance, analyzer 150 may execute on a different set of one or more server computing devices than some or all of assets 110. Analyzer 150 is configured to analyze messages received at multiple assets 110, identify new policies based on the analyses, and publish the new policies for use at the multiple assets 110.

To this end, each asset 110 comprises a reporting component 118 configured to send messages and/or information about messages received at that asset 110 to the analyzer 150. As depicted, reporter 118 operates asynchronously relative to message handler 112, in that it monitors message logs 117 for new records and, as needed, streams data to analyzer 150 reflecting those new records. However, in other embodiments, message handler 112 or message logger 113 may call reporter 118 immediately upon processing a new message, without reporter 118 necessarily needing to access message logs 117. Reporter 118 may stream information for each new message immediately to analyzer 150. Or, reporter 118 may batch information for multiple messages and stream the batched information at times determined according to any of a wide variety of rules or protocols, so as to optimize resource usage.

In an embodiment, reporter 118 sends a log of each message. In other embodiments, reporter 118 may send a log for a message only if the message meets some criteria or rule indicating that the message is of interest. Depending on the embodiment, the log may comprise the full message, or only certain header or transactional information. In an embodiment, instead of sending an individual log for each message, data derived from groups of messages may be aggregated together into various statistics and sent to the analyzer 150.

Analyzer 150 is configured to store the message information in a message database 157. Analyzer 150 further comprises at least one log analyzer 152 configured to analyze the message information in message database 157 on a continual basis, at intervals, and/or in response to triggering conditions.

Log analyzer 152 is further configured to provide state information for system 100 to a policy generation component 154 of analyzer 150. The state information may include a variety of information, depending on the embodiment, such as a count of certain types of messages received by assets 110 per client 190 over a certain amount of time, a number of active connections to each asset 110, network resource usage trends, memory usage trends, processor usage trends, indications of how frequently existing policies have been applied, and so forth.

In an embodiment, the log analyzer 152 may further be configured to include in the state information data that characterizes certain clients 190 based on the message information. For instance, the log analyzer may implement logic that classifies a client 190 as currently being a potential risk based on how often the client 190 has made a certain type of request over a certain period of time. The exact characterizing logic may be configurable by an administrator and/or vary depending on the embodiment.

The frequency with which, or condition(s) in response to which, the state information is provided to the policy generation component 154, may also vary from embodiment to embodiment. The state information need not be sent all at once. For instance, log analyzer 152 may report individual items of the state information as those items are identified.

In an embodiment, log analyzer 152 may further be configured to provide one or more server interfaces by which other components in system 100 may query for various state information available to log analyzer 152. For instance, an asset in system 100 may query the log analyzer 152 for information with respect to communications (if any) with a particular IP address or domain. Such a query may be useful for a variety of reasons—for instance, if a server has received suspicious traffic from the particular IP address or domain, and the results of the query indicate that the suspicious traffic has occurred frequently in the past, the server may be configured to proactively take actions such as blacklisting the IP address or domain.

2.6. Policy Generation and Publication

Based on the state information from log analyzer 152, policy generator 154 is configured to identify potential security threats or other risks to the integrity of system 100. Based on the identified risks, policy generator 154 is further configured to generate, modify, and/or delete policies stored in policy database 155, so as to most optimally address the identified risks (and, in some embodiments, remove policies that were intended to address risks that no longer exist). A large number of techniques exist, or are possible, for identifying risks and generating policies, and the policy generator 154 may utilize any suitable technique(s), depending on the embodiment.

In an embodiment, a policy generated by policy generator 154 may be intended for application at each asset 110 for which the analyzer 150 is responsible. In an embodiment, some policies may be tailored for application only at certain assets 110, such as all assets 110 in a certain geographic region or cluster, or all assets 110 of a certain type, or even a single specified asset 110. In an embodiment, a policy generated by policy generator 154 comprises logic sufficient enough for a given asset 110 to identify messages that are applicable to that policy based solely on information that is already available to asset 110. For example, a policy may have enough information for a single asset 110 to identify an applicable message to block even if that single asset 110 lacks access to message logs 117 from other assets 110 and/or without the single asset 110 being required to communicate about the message with any other components of system 100.

In an embodiment, when a policy has been generated based on traffic information, the policy may be distributed to arbitrary endpoints that may not actually be contributing to the data analysis/collection. For example, log analyzer 152 may discover that a given IP address is 'bad'. Policy generator 154 may then generate a policy to block messages from the IP address. The policy may then be distributed to other systems for their own independent use outside of system 100. For instance, a graylist of IPs that are suspected to be bad may be periodically published to another disconnected fraud detection system configured to use the graylist to calculate risk or fraud scores.

Once a policy has been generated, modified, or deleted, analyzer 150 updates the policy database 155 to include the generated or modified policy, or to remove the deleted policy. A policy publisher 156 component of analyzer 150 is then configured to publish the updated policies in policy database 155 to each asset 110 using any suitable push-based and/or pull-based delivery technique(s). In turn, each asset 110 comprises a policy consumer component 116 configured to receive the policy updates and update the policy cache 115 accordingly. In some embodiments, policy publisher 156 may merely be responsible for storing a policy in policy database 155, and each policy consumer 116 may be configured to access the policy database 155 itself at various times so as to synchronize the corresponding local policy cache 115 with the policy database 155.

In an embodiment, one manner in which policy generator 154 dynamically generates policies for assets 110 is to utilize a set of user-defined, general, system-level policies to determine when to create more specific, asset-level, dynamic policies. For instance, a general policy may be to blacklist an IP address for a certain period of time if a certain type of request has been received at system 100 more than a certain number of times over a certain period of time (either at a single asset 110, or at a number of assets 110 in combination), and to permanently blacklist the IP address if this condition persists. When policy generator 154 determines, from the state information, that the former condition has occurred, policy generator 154 may dynamically generate an asset-level policy that instructs each asset 110 to block messages from the IP address for the certain number of time. If the offending condition ceases, policy generator 154 may remove the policy. Or, if the condition persists, policy generator 154 may modify the asset-level policy to be enforced permanently.

Note that, because message database 157 includes message information gathered from multiple different assets 110, the components of analyzer 150 are capable of comprehensively analyzing message information for all assets 110 in system 100 to identify threats to the system 100 as a whole, instead of just threats that impact individual assets 110. This may allow the analyzer 150 to identify certain types of distributed attacks sooner than would be possible in a system where each asset's logs were analyzed in isolation. Again, because the state information describes the state of network traffic for system 100 as a whole, as opposed to simply with respect to an individual asset 110, policy generator 154 may be capable of generating policies to address distributed attacks more quickly than would otherwise be possible, thus minimizing the impact of such attacks on the overall system 100. Moreover, if one type of attack is seen at one of or a small number of assets 110, the policy generator 154 may generate policies for other assets 110 or even all assets 110 to address the attack, thus allowing other assets 110 to pre-emptively deploy policies for attacks that those assets 110 may have not yet seen.

2.7. Distributed Analyzers

Figure 2:
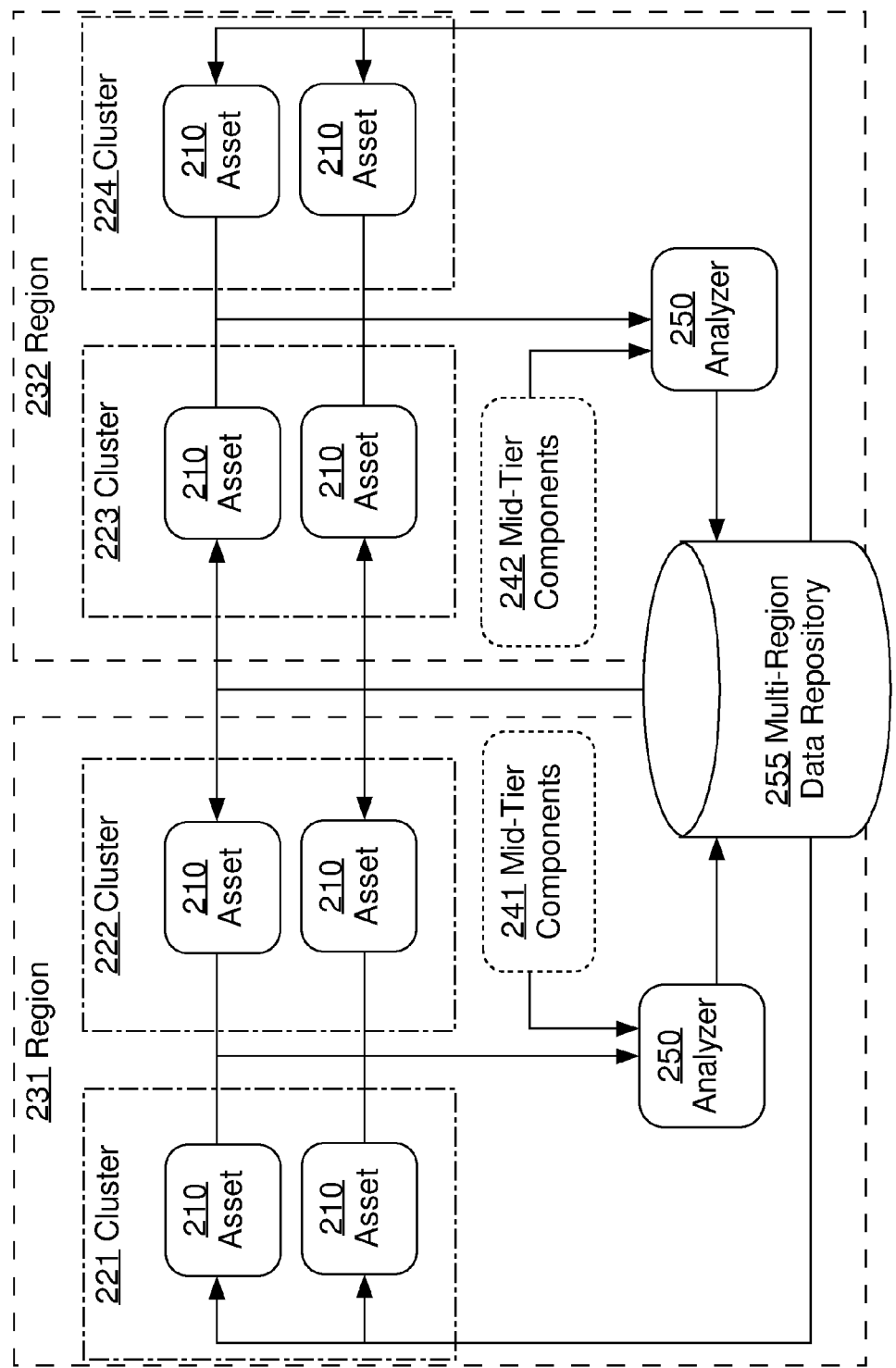
FIG. 2 illustrates an example networked computer system comprising multiple analyzers responsible for different groups of assets.

FIG. 2 illustrates an example networked computer system 200 comprising multiple analyzers 250 responsible for different groups of assets 210, according to an embodiment. As with system 100 of FIG. 1, system 200 comprises one or more computing devices. These one or more computing devices comprise any combination of hardware and software configured to implement the various logical components described herein, including components 210-255.

In an embodiment, each asset 210 may comprise the same components as described with respect to asset 110 of FIG. 1, and each analyzer 250 may comprise the same components as described with respect to analyzer 150 of FIG. 1. Thus, in an embodiment, systems 100 and 200 may in fact be the same systems, except that only a single region is depicted for system 100. In other embodiments, assets 210 and/or analyzer 250 may instead be configured to provide functionality similar to that described with respect to assets 110 and/or analyzer 150, but using different components and/or arrangements thereof than depicted in FIG. 1. While system 200 comprises multiple analyzers 250, it should be noted that the techniques described herein are equally applicable to systems with a single, centralized analyzer, such as would be the case if analyzer 150 were the only analyzer component in system 100.

System 200 is subdivided into two or more regions, such as the depicted regions 231 and 232. Regions 231 and 232 correspond to geographic regions. For instance, region 231 may correspond to a data center for North America while region 232 may correspond to a data center for Europe. However, in an embodiment, regions 231 and 232 may be any groupings of the assets 210, without regard to whether those groups correspond to a geographic region.

Each region 231 may comprise one or more clusters. For instance, as depicted, region 231 comprises clusters 221 and clusters 222, while region 232 comprises clusters 223 and 224. Each cluster 221-224 comprises multiple assets 210. A cluster may be any arbitrary sub-group of assets 210. For instance clusters 221 and 223 may be "web clusters," consisting of those assets 210 in their respective regions that are (or protect) web server assets, while clusters 222 and 224 may be "API clusters," consisting of those assets 210 in their respective regions that are (or protect) API server assets. However, in other embodiments, clusters may be grouped by other categorization schemes, geographic proximity, implementing computing devices, or any other suitable grouping criteria.

Each asset 210 is configured to stream or otherwise send information about received messages to the analyzer 250 of the region 231/232 to which the asset 210 belongs. The analyzers 250 are configured to publish policies to a shared multi-region data repository 255. For instance, the multi-region data repository 255 may store policy database 155. The multi-region data repository 255 may be a central data repository, or the multi-region data repository 255 may be distributed across each region 231/232. For instance, each region 231/232 may store its own copy of multi-region data repository 255 that is synchronized with copies in other regions 231/232 through any suitable synchronization technique(s).

At each asset 210, a local copy of policies is kept synchronized with those found in the multi-region data repository 255. An asset 210 may access the multi-region data repository 255 directly, or the synchronization may occur via the corresponding analyzer 250. Because each asset 210 maintains a local copy of policies, each asset 210 can be assured that it is applying a relatively recent set of policies, even if the asset were to lose contact with its corresponding analyzer 250 or be unable to communicate with multi-region data repository 255 for a period of time. The frequency with which synchronization occurs may be configurable by an administrator based on, for instance, availability of system resources and how much "lag" time is acceptable between generating a policy at analyzer 250 and enforcing the policy at an asset 210.

In an embodiment, each analyzer 250 may be configured to generate policies based on message information from just those assets 210 in the region 231/232 to which the asset 210 belongs. Thus, it is likely that some analyzers 250 may generate policies that other analyzers 250, on account of different network traffic in their respective region 231/232, might not generate. In another embodiment, each analyzer 250 shares the message information for the corresponding region 231/232 with analyzers 250 from other regions by means of, for instance, storing message database 157 as a shared database in multi-region data repository 255. This may produce embodiments in which, if each analyzer 250 is similarly configured, each analyzer 250 may therefore eventually generate similar policies (though, on account of latency between data sharing processes in the different regions, one analyzer 250 might generate a policy well before another analyzer 250). This provides redundancy in the event that an analyzer 250 was to fail.

2.8. Mid-Tier Components

In an embodiment, system 200 optionally comprises one or more mid-tier components 241. Mid-tier components 241 are configured to accept inputs from human operators and/or automated processes executing within system 200 indicating additional policies to be applied by assets 210. These additional policies may be, for instance, fixed policies or business rules that analyzer 250 might not have dynamically generated, but that the human operators or automated processes identified using various techniques. Each analyzer 250 may be configured to expose an API for the mid-tier components 241 to accomplish such tasks as retrieving state information or message logs (e.g. via log analyzer 152), retrieving a current set of policies, or instructing the analyzer 250 to modify or generate a new policy. For instance, in an embodiment, one mid-tier component 241 provides a web interface for a human operator to view statistics related to message logs and construct a new policy in view of such statistics. Another mid-tier component may utilize data other than that available to analyzer 250 to perform fraud checks, and, based thereon, automatically generate new policies to send to analyzer 250. Yet another mid-tier component 241 may be a component optimized to generate policies by interacting with other, non-depicted components deployed within an asset 110 (e.g. a pre-filter component deployed in front of the message handler 112), that are equipped to quickly identify certain types of attacks, such as those that can be detected with simple rate-breach limits.

2.9. Miscellaneous

Systems 100 and 200 are but examples of systems that are suitable for performing the techniques described herein. Other systems may comprise additional or fewer components in varying arrangements. The division of functions between components may also differ, depending on the embodiment. The subcomponents of asset 110 and analyzer 150 that are depicted in FIG. 1 are logical components described with the intent of explaining the inventive techniques described herein. The subcomponents may or may not actually correspond to distinct sets of software applications, packages, modules, classes, processes, or objects. For instance, in some embodiments, the processes of identifying risks and generating policies may be interrelated, such that log analyzer 152 and policy generator 154 are implemented as a single server application. As another example, message handler 112, message logger 113, and policy enforcer 114 may in some embodiments form a single software application.

The various data elements described herein may be stored in a variety of manners. For example, each of policy cache 115, message logs 117, policy database 155, and message database 157 may be stored in a separate one or more database tables, databases, or files in one or more data repositories. Alternatively, some of these various data elements may be stored together within one or more combined database tables, databases, and/or files.

3.0. Functional Overview 3.1. Applying Local Policies

Figure 3:
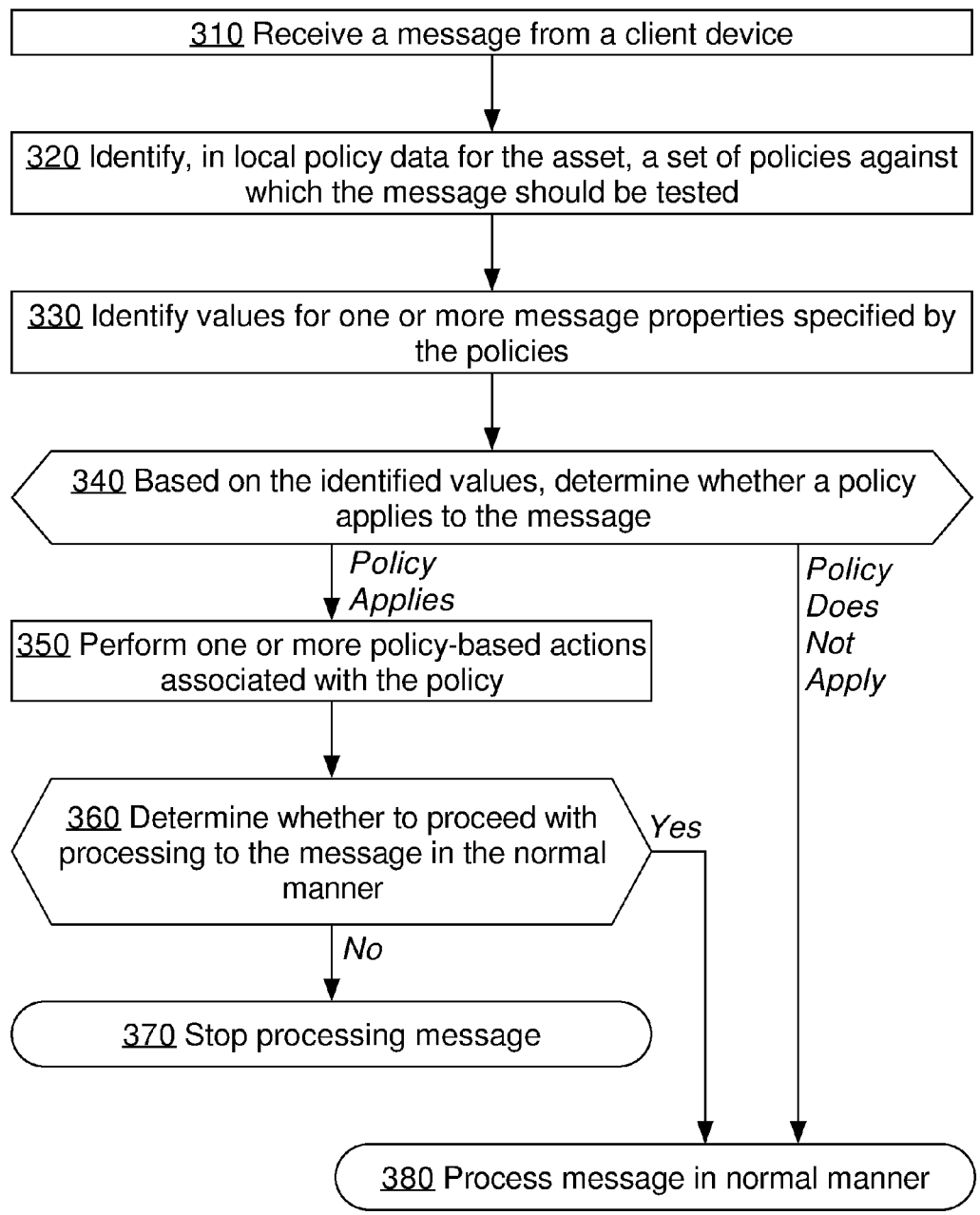
FIG. 3 illustrates an example flow for applying local policies in a distributed traffic management system.

FIG. 3 illustrates an example flow 300 for applying local policies in a distributed traffic management system, according to an embodiment. The various elements of flow 300 may be performed in a variety of systems, including systems such as systems 100 and 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 300 is one example of applying local policies at an asset. Other flows may comprise fewer or additional elements, in varying arrangements.

Block 310 comprises receiving a message from a client device, such as a client 190 or any other device from which a message may be received. The message may be any type of message, such as an HTTP request or TCP packet. The message is received at an asset, such as asset 110 or any other suitable asset. The message may, in an embodiment, specify or otherwise indicate a designated action to be performed, such as retrieving a file, executing an application, forwarding the message to another system component, and so forth.

Block 320 comprises identifying, in local policy data for the asset, a set of policies against which the message should be tested. For instance, the local policy data may be policy cache 115, or any other suitable data structure(s) that describe policies and are stored on a storage device that is local to the asset.

Block 330 comprises identifying values for one or more message properties specified by the policies. For instance, message properties may include, without limitation, header fields such as source or destination IP addresses, a uniform resource indicator (URI) being requested, a referring URI, cookie or session data associated with the message, timestamps, transactional metadata, the presence of certain keywords in the payload, and so forth. In an embodiment, the message properties may include statistics or other information derived at least partially from previous messages that were received by the asset and that have one or more similar properties. These previous messages may have been logged for this and other purposes in, for instance, message log 117 or any other suitable local repository. The message properties may correspond to predefined or well-known message field or characteristics, such that the logic for deriving the message properties is already known to the asset. Alternatively, a policy may specify how to identify a value for a message property by specifying functions or other executable logic configured to calculate the value from other message properties.

Block 340 comprises, based on the identified values, determining whether a policy applies to the message. Any suitable technique for determining whether a policy applies to a message may be utilized. Block 340 may comprise, for instance, comparing a value or range of values specified by the policy to the value or values identified in block 330. A policy may include one or more conditions. Depending on the logic specified by the policy, a message to which the policy applies may be required to match anywhere from one to all of these conditions.

Block 340 may be performed for some or all of the policies identified in block 320. In some embodiments, blocks 320-340 are performed using a number of iterations. For instance, a single, highest priority policy may be loaded in a first iteration. The necessary values for that policy are calculated per block 330. The determination of block 340 is then performed for that single policy. If the policy does not apply, then additional iterations are performed for each of the other policies in succession, until a matching policy is found, or until it is determined that no policies apply. In other embodiments, various optimizations such as decision trees or state machines may be utilized, such that multiple policies or even all policies may be considered in a single iteration. In an embodiment, once a matching policy is found, no other policies need be considered, and thus block 340 (and optionally block 330) need not be performed with respect to the other policies. In an embodiment, all policies are considered regardless of whether a matching policy has been found, and various prioritization mechanisms may be utilized to reconcile any conflicting policy-based actions indicated by multiple applicable policies.

If it was determined in block 340 that a policy applies to the message, then flow proceeds to block 350. Block 350 comprises performing one or more policy-based actions associated with the applicable policy. Policy-based actions may include, for instance, blocking the message (e.g. "blacklisting"), forwarding the message to a destination other than the destination to which the message is addressed, allowing the message to proceed to the addressed destination (e.g. "whitelisting"), responding to the message with an error message or other suitable message, and/or any other suitable type of action that the asset may be configured to implement. As another example, an action may be to log detailed message information that would not normally be logged for the message (e.g., so as to be useful for subsequent policy determination or generation processes).

Block 360 comprises determining whether to proceed with processing the message in the normal manner (e.g. performing the designated action that is indicated by the message). Certain policy-based actions, such as blocking the message or responding with an error message, may implicitly or explicitly instruct the asset not to proceed with processing the message in the normal manner, and consequently flow proceeds to block 370, in which processing of the message ceases. Other policy-based actions, such as allowing the message, or logging detailed message information, may implicitly or explicitly instruct the asset to proceed with processing the message in the normal manner. Consequently, flow proceeds to block 380.

Flow also proceeds to block 380 if it was determined in block 340 that no policy applies the message. Block 380 comprises processing the message in the normal manner, such as by performing the designated action that is indicated by the message.

3.2. Policy Generation and Publication

Figure 4:
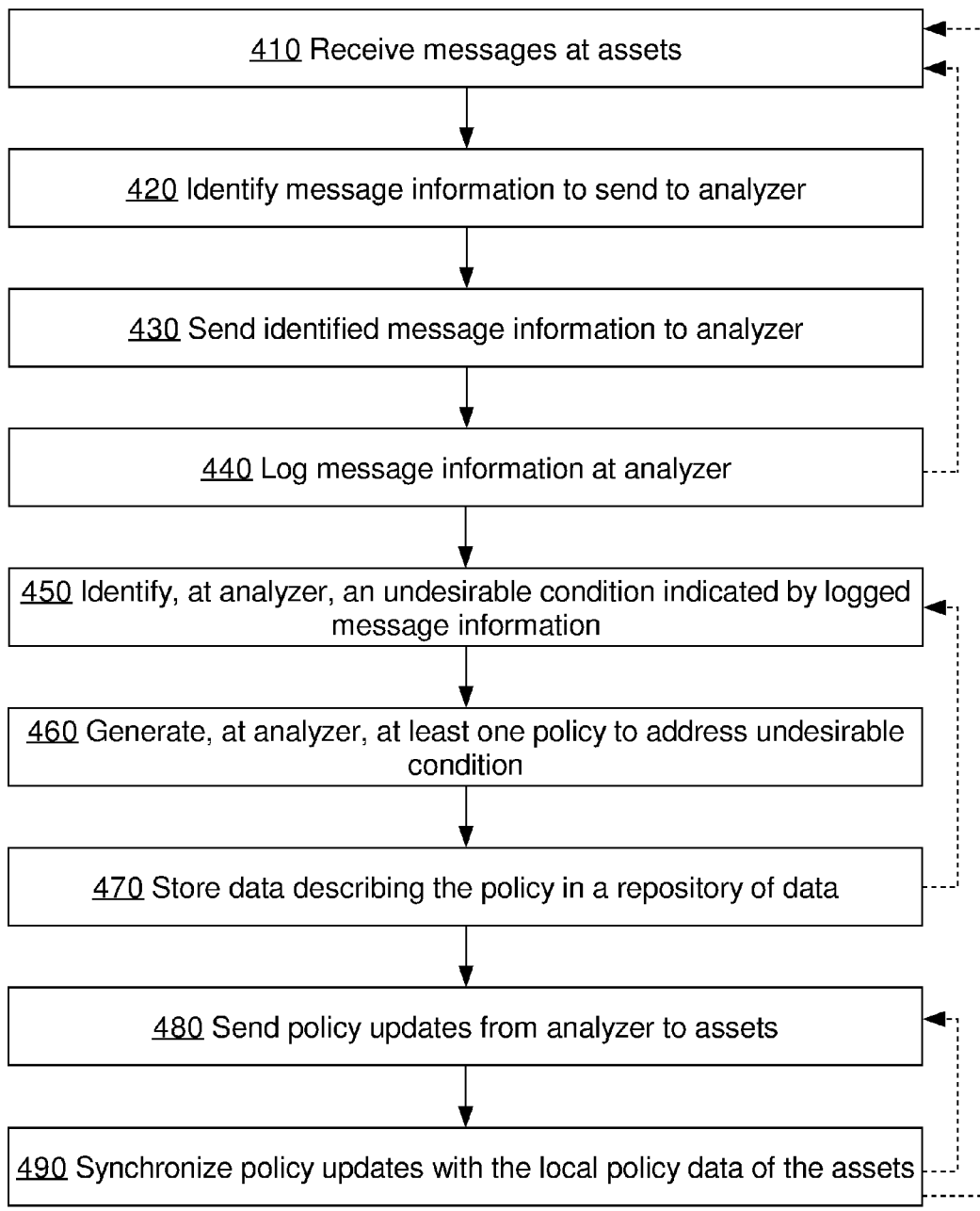
FIG. 4 illustrates an example flow for generating and publishing policies in a distributed traffic management system.

FIG. 4 illustrates an example flow 400 for generating and publishing policies in a distributed traffic management system, according to an embodiment. The various elements of flow 400 may be performed in a variety of systems, including systems such as systems 100 and 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 410 comprises receiving messages at assets, such as would occur as a result of multiple assets performing block 310 of FIG. 3. Though not depicted, each of the assets may perform flow 300 in response to some or all of the messages it receives. Performance of flow 400 may proceed from block 410 asynchronously relative to the assets performing flow 300.

Block 420 comprises the assets identifying message information to send to an analyzer, such as analyzer 150. Block 430 comprises sending the message information to the analyzer. In some embodiments, block 420 is a trivial step since the message information is in essence a full copy of each message. In other embodiments, block 420 may comprise identifying messages of potential interest to the analyzer 150, using a variety of detection techniques. For instance, an asset may be configured with various rules or machine learning logic for identifying unusual messages that may impact policy decisions made by the analyzer 150. Thus, rather than sending message information for all messages, an asset will send message information only for the messages of potential interest. In an embodiment, the message information may further be filtered, summarized, aggregated, or otherwise processed so as to include only data (e.g. fields, properties, statistics, etc.) that may be of interest to the analyzer. In an embodiment, the message information may include data collected in association with processing a given message, such as an amount of asset processing time or asset resources used to respond to the message, or whether any policies were applied.

In an embodiment, blocks 420-430 are performed by processes, at the assets, that execute asynchronously relative to message reception in block 410. For instance, each asset may include a message streaming component, such as reporter 118, which reads a local message log generated by the asset in response to block 410 on a periodic or other basis, and then performs blocks 420-430 based thereon. In such embodiments, the message information may be batched together for multiple messages at once. Or, the message streaming component may continuously identify the message information, but wait to deliver the message information until network resources become available and/or other conditions are met. In other embodiments, blocks 420-430 are performed immediately responsive to receiving a message, such as upon receipt of a message in block 310 of flow 300 or upon terminating flow 300 with respect to the message.

Block 440 comprises the analyzer logging the message information. The analyzer may log the entire message information, or the analyzer may process the message information and log only filtered, summarized, or aggregated message information. The message information may be stored in any suitable repository, such as message database 157 and/or multi-region data repository 255.

Block 450 comprises the analyzer identifying an undesirable condition indicated by the logged message information. For instance, the analyzer may identify an attack on an asset from a certain IP address or group of IP addresses, a distributed attack that is affecting multiple systems, a type of message or group of clients that is consuming an undesirable amount of system resources, and so forth. The analyzer may employ any suitable logic for detecting such conditions, such as logic predicated upon pre-defined rules or pattern recognition. Optionally, block 450 may further or instead comprise identifying undesirable conditions based on other state information for a system, such as server load statistics (e.g. indicating whether to generate a policy that temporarily redirect requests away from an overloaded or failed server). Block 450 may also optionally comprise identifying previously undesirable conditions that no longer exist, so that unnecessary policies may be removed.

Block 460 comprises the analyzer generating at least one policy to address the undesirable condition. The policy may address the undesirable condition in any suitable manner, such as blocking an IP address or range of IP addresses, redirecting certain types of requests, and so forth. Any suitable adaptive policy generation technique may be utilized. In an embodiment, the policy is an asset-level policy capable of application at a single asset without that asset having knowledge of what messages are being received at other assets, and without that asset having to communicate with the analyzer.

In an embodiment, the analyzer may generate certain asset-level policies based on more general system-level policies. The system-level policies specify criteria that indicate an undesirable condition based at least on functions of various properties derived from the message information, potentially including properties that reflect message information from multiple assets. The system-level policies may further indicate what asset-level policy should be generated when an undesirable condition is found.

In an embodiment, a policy may include time criteria. The analyzer and/or individual assets may be configured to automatically remove expired policies, as indicated by their respective time criteria.

Block 470 comprises storing data describing the policy in a repository of policy data, such as policy database 155 and/or multi-region data repository 255.

Blocks 450-470 may be repeated with respect to a number of possible undesirable conditions before proceeding with the remainder of flow 400.

Block 480 comprises sending policy updates to the assets. Block 480 may comprise, for instance, the assets retrieving the policy data directly from the repository of policy data, the assets requesting at intervals that the analyzer provide the policy updates, and/or the analyzer pushing new policy updates to the assets as new policies are generated, or on some other basis. For instance, each asset may comprise a consumer component, such as policy consumer 116, that listens for policy updates and/or polls the analyzer or repository for policy updates.

Block 490 comprises the assets synchronizing their own local policy data with the policy updates using any sort of synchronization means. Note that, since the assets are performing various iterations of flow 300 asynchronously relative to flow 400, an asset may, after performing one iteration of flow 300, perform block 490 before receiving another message. Thus, the next iteration of flow 300 for that asset will be based on updated policy data indicating one or more new policies that were not considered in the previous iteration of flow 300.

Flow 400 is one example of generating and publishing policies. Other flows may comprise fewer or additional elements, in varying arrangements. For example, in one embodiment, block 440 is not necessary. In another embodiment, blocks 450 and 460 may be combined. As another example, flow 400 may further comprise the analyzer receiving fixed policies reflecting business rules or filters generated by outside components, as may be received, for instance, via mid-tier components 241/242. These fixed policies may also be added to the repository of policy data in block 470.

In an embodiment, blocks 410-440 and/or blocks 480-490 are performed on a substantially continuous basis, asynchronously with respect to the rest of the elements of flow 400. Meanwhile, blocks 450-470 may be repeated at periodic or other intervals, or in response to various triggering conditions, such as the receipt of certain types or quantities of message information.

In an embodiment, blocks 430-480 may be performed by multiple analyzers in a distributed system, such as system 200 or other distributed systems.

4.0. Example Implementation Details

According to an embodiment, an analyzer may generate asset-level policies configured for some or all of, without limitation: enforcing security policies, blocking malicious or fraudulent activity, enforcing business rules, executing custom action on requests based on certain conditions such as rate-limits, anti cross-site request forgery protection at the edge of the network, anti cross-site scripting protection at the edge of the network, proactive security monitoring in real-time to enable quick reaction times (including implementation of alert actions and/or route actions to route malicious traffic to a sandbox cluster to study the security attack patterns), reactive security monitoring based on security-related incidents, adhoc analysis of security related data to derive insights about any infrastructure weaknesses, and/or misleading attackers so that an asset becomes less of a target.

4.1. Example Policy Structures

According to an embodiment, a first policy database comprises a plurality of rows in a database. Each row represents a policy. Required fields of the row may include, for instance, a policy identifier, a path parameter, and an action parameter. Optional fields of the row may include a methods parameter, rate parameter, region parameter, cluster parameter, host parameter, and/or custom parameter. Each of the parameters corresponds to a different message property, and may comprise a single value, a range of values, and/or a list of values to compare to the corresponding message property in order to determine if the policy applies.

According to an embodiment, a second policy database represents policies using rows. Each row specifies a subject on which to enforce actions (e.g. an IP address, device identifier, User Agent, Customer ID, etc) and a policy ID. Each row further includes values for one or more fields corresponding to message properties, such as path, methods, region, cluster, host, or custom. Depending on the embodiment, one or more of the fields may be left blank, indicating message properties that are ignored when determining whether the policy applies. Each row may further include optional fields that indicate a schedule for the policy, such as a start time, end time, and/or recurrence pattern. Each row further includes a field that specifies an action to perform.

The first policy database and the second policy database may be used in conjunction with each other or by themselves, depending on the embodiment. In an embodiment, the first policy database is used by an analyzer at a system level to determine when to generate policies in the second policy database, whereas the second policy database is used at the assets to enforce policies on incoming messages. However, in other embodiments, local policy data may include both the first policy database and the second policy database.

The first policy database and the second policy database are simply examples of policy data structures. In yet other embodiments, policies may be stored locally and/or globally in any other suitable structure or format.

4.2. Example Policy Caches

According to an embodiment, an asset may store local policy data in the form of one or more distinct caches. In an embodiment, a first cache is a global resource cache. The global resource cache comprises a mapping of resource URIs for assets to the appropriate rules to be applied for those URIs. One use of the global policy cache, among other uses, is enforcing blacklists and special rules on specific URIs. For instance, in an example use case, customer service centers are whitelisted to use access-sensitive endpoints on an Ecommerce platform. However, although the whitelisting would permit customer service agents to access all endpoints, there may be a few URIs that are meant to be used by other internal tools, developers, and test teams, and, should be blocked for customer service agents. By listing such resources in the global resource cache and evaluating the incoming request URI for a match in global resource cache, such business rules can be enforced. In general, the global resource cache comprises resource rules that are good candidates for short-circuiting the rest of the processing in the workflow.

In an embodiment, a second cache is a subject rules cache. The subject rules cache comprises a mapping of a subject (e.g. IP, device identifier, customer Id) to immediate rules to enforce. This cache contains rules that can be categorically applied to the subject without specific handling for each URI. An example of such a policy is to "block every request from customer Id 12456689."

In an embodiment, a third cache is a subject resource cache. The subject resource cache comprises a mapping of a subject (e.g. IP, device identifier, customer Id) to resource-specific rules to enforce. This cache comprises policies that can be applied only to specific URIs. An example of such a policy is to "block requests from customer Id 12456689 to the URI path /home."

Any of a variety of combinations of these caches and/or other types of caches may be utilized to store policies. In a specific embodiment, these three caches are utilized together using the following workflow. First, a message is received. The message is then processed with a set of global exclusions to determine whether to exclude the message from policy enforcement. If the message is not excluded, then the asset next determines whether the message URI is in the global resource cache. If not, the asset next determines whether a customer ID corresponding to the message is in the subject rules cache or the subject resource cache. If not, the asset next determines whether the source IP address of the message is in the subject rules cache or the subject resource cache. If not, the asset next determines whether the device identifier of the message is in the subject rules cache or the subject resource cache. If not, then the message is processed normally. However, if any of the foregoing determinations is positive, the appropriate action(s) for the corresponding policies are enforced.

4.3. Example Configuration Options

According to an embodiment, certain behaviors of an asset are configurable with some or all of the following configuration options. A frequency parameter controls how often the asset updates the local policy cache. An example frequency may be, for instance, thirty seconds. Various "enabled" parameters may control whether individual sub-components of an asset are active, so that, for instance, policy enforcement or log reporting may be disabled for certain assets. A mode parameter controls whether the asset is configured to actually perform policy-based actions, or operate in a test mode in which the asset simply reports what policy-based actions the asset would have performed had the asset not been in test mode. A log level parameter may control how much message information is logged and/or sent to an analyzer. A whitelist parameter may control whether the asset actually enforces other policies on whitelisted messages. In other embodiments, no such configuration parameters may be provided, and/or a variety of other configuration parameters are possible.

4.4. Example Message Logs

According to an embodiment, message information may be logged and/or streamed in a JSON blob or other suitable data structure. The data structure may comprise, without limitation, fields such as device identifier, IP, customer ID, application name, geographic location data, request alias, request URL, response status, date, host name, message batch ID, detected policy action, and so forth. For instance, one such log may be as follows:

TABLE 1

EXAMPLE MESSAGE LOG

{
 "Ip": "127.0.0.1",
 "capp": "apiproxy",
 "customerId": "135048091",
 "detectaction": "BlockAction with status code 403\t
    message: Forbidden",
 "geoData": "[ zip=null, pmsa=reserved,
    network_type=reserved, dma=-1, bw=reserved,
    areacode=reserved, asnum=reserved, long=reserved,
    ipaddress=127.0.0.1, country_code=US,
    throughput=reserved, network=reserved,
    city=reserved, timezone=reserved,
    region_code=reserved, county=reserved,
    company=Internet_Assigned_Numbers_Authority,
    continent=reserved, domain=reserved,
    msa=reserved, fips=reserved, lat=reserved, ]",
 "log": "",
 "logLevel": "INFO",
 "request_alias": "/favicon.ico",
 "request_url":
    "http://movies.netflix.com:1234/favicon.ico",
 "response_status": "200",
 "rowId": "1392335738461-1"
}
1392335742847
mac-p.corp.netflix.com
20140213
23
merged_20140214T001750_1

Of course, a variety of other log structures and fields are also possible.

4.5. Example Queries

According to an embodiment, an analyzer may be configured to identify subjects for which to generate policies using a variety of queries involving the logged message information. Examples of such queries may include, without limitation: identify the top n requesting IP addresses in a specific region (e.g. US), identify the top n requesting IP addresses in a specific region that have called a specific API, identify the top n requesting IP addresses in a specific region that have invoked a method other than POST with respect to a particular API, identify the top n requesting IP addresses in a specific region that are scanning services for potentially open administrative consoles, and identify the top n requesting IP addresses in a specific region that are scanning services for PHP endpoints. Of course, these examples are merely illustrative of the large variety of queries that may be formulated.

Similarly, a mid-tier component might make these and other queries to the analyzer, for purposes such as statistical analysis, formulating business rules, and so forth.

5.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
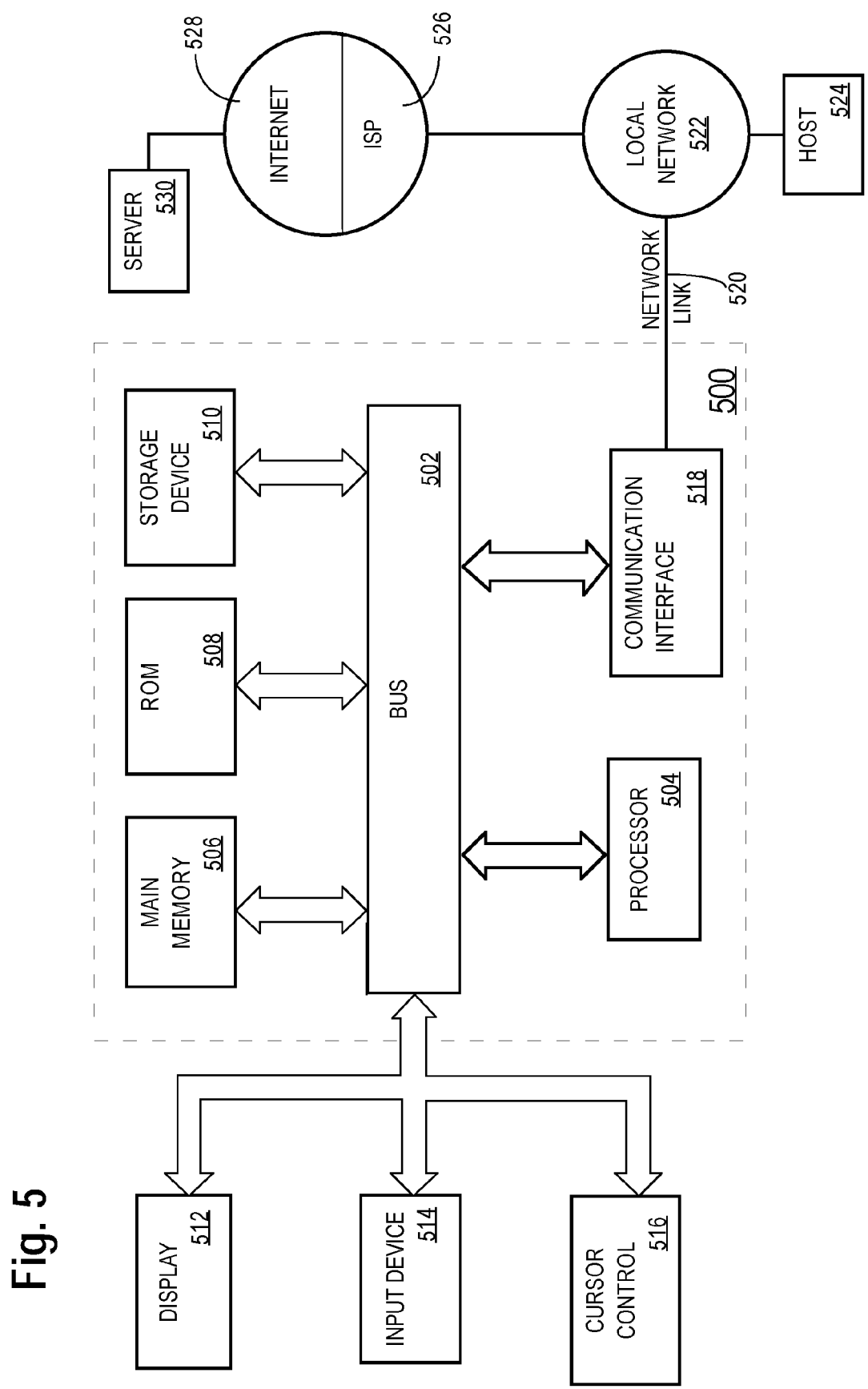
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims

What is claimed is:

1. A computer system comprising:
 a first data repository storing global policy data that describes policies;
 a plurality of computer assets wherein each asset of the plurality of computer assets are programmed to: receive messages from client devices; store local policy data in a second data repository that comprises a global resource cache, a subject rules cache, and a subject resource cache; determine which of the policies from the second data repository apply to which of the messages; identify policy-based actions to perform with respect to the messages based on which of the policies apply to which of the messages; send message information logged from the messages to an analyzer component; update the local policy data to reflect updates to the global policy data;
 an analyzer component programmed to: receive the message information from each of the plurality of computer assets; collectively analyze the message information from each of the plurality of computer assets; generate new policies based on collectively analyzing the message information; update the global policy data to describe the new policies.

2. The computer system of claim 1, wherein each asset of the plurality of computer assets is deployed at an edge of a first network, and wherein the client devices are deployed within a second network.

3. The computer system of claim 1, wherein the plurality of computer assets and analyzer are deployed in a first region of the computer system, the computer system further comprising one or more additional regions, each region comprising a separate plurality of computer assets and a separate analyzer, the data repository being shared between the first and the one or more additional regions.

4. The computer system of claim 1, wherein each policy of the policies is a data structure that indicates logic for determining whether the policy applies to a given message, as well as one or more instructions indicating one or more particular policy-based actions to perform with respect to the given message if the policy applies to the given message.

5. The computer system of claim 1, wherein the analyzer is further configured to: identify one or more of the new policies based on determining, from the collectively analyzed message information, that a condition described by a system-level policy exists; generate one or more asset-level policies comprising logic for identifying messages to block or redirect in view of the described condition; update the global policy data to include the generated one or more asset-level policies.

6. The computer system of claim 1, wherein the analyzer is further configured to: identify a distributed attack on the computer system based on the collectively analyzed message information; generate a first policy comprising logic for identifying messages involved in the distributed attack; update the global policy data to describe the first policy.

7. The computer system of claim 1, wherein the analyzer is further configured to, based on the collectively analyzed message information: identify an attack that is occurring at a first asset of the plurality of computer assets; generate a first policy comprising logic for identifying messages involved in the attack; update the global policy data to describe the first policy;
wherein a second asset of the plurality of computer assets is configured to: based on the updated global policy data, update the local policy data of the second asset to describe the first policy, the second asset having not yet received messages involved in the attack at a time the local policy data of the second asset is updated, based on the first policy, block or redirect a message involved in the attack.

8. The computer system of claim 1, wherein the messages indicate designated actions for the plurality of assets to perform, wherein each asset is configured to perform the policy-based actions instead of or in addition to the indicated designated actions for messages to which the policies apply.

9. The computer system of claim 1, wherein a policy-based action indicated by a given policy of the policies is one of: blocking any message to which the given policy applies, redirecting any message to which the given policy applies, or allowing an asset to respond normally to any message to which the given policy applies.

10. The computer system of claim 1, wherein an asset of the plurality of computer assets is configured to apply policies, from the local policy data of the asset, to messages, even when the analyzer component and the data repository are inaccessible to the asset.

11. A data processing method comprising:
storing, at a computer asset, local policy data describing policies in a global resource cache, a subject rules cache, and a subject resource cache;
receiving, at the computer asset, messages from client devices, wherein the messages indicate designated actions for the computer asset to perform;
determining, at the computer asset, which of the policies that are stored in the global resource cache, the subject rules cache, or the subject resource cache apply to which of the messages;
identifying, at the computer asset, policy-based actions to perform with respect to the messages based on which of the policies apply to which of the messages;
sending, from the computer asset, message information logged from the messages to an analyzer component;
updating, by the computer asset, the local policy data to reflect updates to global policy data generated by the analyzer component;
wherein the computer asset is implemented by one or more computing devices.

12. The method of claim 11, wherein each policy of the policies is a data structure that indicates logic for determining whether the policy applies to a given message, as well as one or more instructions indicating one or more particular policy-based actions to perform with respect to the given message if the policy applies.

13. The method of claim 11, wherein the messages indicate designated actions for the computer asset to perform, and the method further comprising performing applicable policy-based actions instead of or in addition to the designated actions indicated for messages to which the policies apply.

14. The method of claim 11, further comprising applying policies from the local policy data to messages even when the analyzer component and the global policy data are inaccessible to the asset.

15. The method of claim 11, further comprising:
receiving, at the analyzer component, message information logged at each asset of a plurality of computer assets, including the computer asset;
collectively analyzing, by the analyzer component, the message information logged at each of the plurality of computer assets;
generating, by the analyzer component, new policies based on collectively analyzing the message information;
updating, by the analyzer component, the global policy data to describe the new policies.

16. A data processing method comprising:
storing, at a computer asset, local policy data describing policies in a global resource cache, a subject rules cache, and a subject resource cache;
receiving, at the computer asset, messages from client devices, wherein the messages indicate designated actions for the computer asset to perform;
determining, at the computer asset, which of the policies that are stored in the global resource cache, the subject rules cache, or the subject resource cache apply to which of the messages;
identifying, at the computer asset, policy-based actions to perform with respect to the messages based on which of the policies apply to which of the messages;
receiving, at an analyzer component, message information logged from the messages;
analyzing, at the analyzer component, the message information to generate and store new policies in a global policy data repository;
updating, at the computer asset, the local policy data to reflect updates to global policy data that are generated by the analyzer component;
wherein the computer asset is implemented by one or more computing devices.

17. The method of claim 16,
wherein the analyzer component is one of a plurality of analyzers, each configured to perform the steps of claim 16 with respect to a different plurality of computer assets;

wherein the global policy data repository is shared amongst at least the plurality of analyzers.

18. The method of claim 16, further comprising:

identifying one or more of the policies based on determining, from the message information, that a condition described by a system-level policy exists;

generating one or more asset-level policies comprising logic for identifying messages to block or redirect in view of the described condition;

updating the global policy data to include the generated one or more asset-level policies.

19. The method of claim 16, further comprising:

identifying a distributed attack on a computer system comprising the computer asset based on collectively analyzing the message information;

generating a first policy comprising logic for identifying messages involved in the distributed attack;

updating the global policy data to describe the first policy.

20. The method of claim 16, further comprising:

based on the message information, the analyzer component identifying an attack that is occurring at the computer asset;

generating a first policy comprising logic for identifying messages involved in the attack at least a second computer asset, the analyzer component having not yet received message information from the second computer asset indicating that the second computer asset has received messages involved in the attack;

updating the global policy data to describe the first policy.

* * * * *